(12) United States Patent
Speck et al.

(10) Patent No.: US 6,315,485 B1
(45) Date of Patent: Nov. 13, 2001

(54) LOW OBSERVABLE AIRCRAFT FASTENER TREATMENT

(75) Inventors: William S. Speck, Pasadena; Paul E. Otto, Laguna Niguel, both of CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 0 days.

(21) Appl. No.: 09/373,956

(22) Filed: Aug. 13, 1999

(51) Int. Cl.$^7$ .................................................. F16B 19/00
(52) U.S. Cl. ........................ 403/7; 403/404; 244/132; 411/373
(58) Field of Search ...................... 403/6, 7, 23, 24, 403/404, 408.1; 411/371, 373; 244/132, 133

(56) References Cited

U.S. PATENT DOCUMENTS

| | | | |
|---|---|---|---|
| 3,425,313 | 2/1969 | Villo | 85/53 |
| 3,508,650 | 4/1970 | Carr | 209/399 |
| 3,592,100 | 7/1971 | Makiewicz | 85/1 |
| 3,885,492 * | 5/1975 | Gutshall | 411/373 |
| 3,969,786 * | 7/1976 | Peak | 411/373 X |
| 4,394,096 * | 7/1983 | Stevens | 403/408.1 |
| 4,413,374 | 11/1983 | Ferdinand et al. | 16/121 |
| 4,452,556 | 6/1984 | Nelson et al. | 411/377 |
| 4,630,168 | 12/1986 | Hunt | 361/218 |
| 4,884,929 | 12/1989 | Smith et al. | . |
| 4,979,281 | 12/1990 | Smith et al. | . |
| 5,391,028 | 2/1995 | Charles | 411/374 |
| 5,603,472 | 2/1997 | Hutter, III | 244/132 |

\* cited by examiner

Primary Examiner—Harry C. Kim
(74) Attorney, Agent, or Firm—Terry J. Anderson; Karl J. Hoch, Jr.

(57) ABSTRACT

In accordance with the present invention, there is provided a low observable fastener for use with a panel structure having a panel bore formed therein. The panel structure has a RAM panel layer formed thereon. The RAM panel layer has a RAM panel layer bore formed therethrough aligned with the panel bore. The RAM panel layer bore defines an inner surface. The fastener is provided with a fastener head disposable within the panel bore. The fastener head has a tool engagement recess formed therein. The fastener is further provided with a RAM treatment layer disposed upon the fastener head. The RAM treatment layer has a fastener access bore aligned with the tool engagement recess of the fastener head. The RAM treatment layer further has a cylindrical outer surface sized and configured to be concentrically received by the inner surface of the RAM panel layer. The cylindrical outer surface is sized and configured to absorb electromagnetic energy radiating from the inner surface of the RAM panel layer for mitigating radar emissions formed adjacent thereto.

33 Claims, 1 Drawing Sheet

LOW OBSERVABLE AIRCRAFT FASTENER TREATMENT

FIELD OF THE INVENTION

The present invention relates generally to aircraft panel fasteners, and more particularly to a fastener treatment formed of radar absorptive material (RAM) for mitigating fastener radar observability.

BACKGROUND OF THE INVENTION

Large numbers of removable panels are typically disposed about the exterior surface of modern stealthy aircraft, such as access doors and engine bay covers and the like. The panels are typically formed of a metal alloy or composite and conform to the surface contour of the adjacent aircraft skin. A multitude of panel fasteners are required to be used for removably mounting the contoured panels. Such panel fasteners typically comprise a threaded shank and a fastener head. A driving slot or recess is formed in the surface of the fastener head. A mating driving tool engages the recess for fastener installation and removal. The fastener head further includes a conical countersink portion. When installed, the countersink portion of the fastener head is seated within a counterbore formed in the panel, in a position recessed relative to a local external surface plane of the panel. Such configuration allows the surface of the fastener head to be flushed-mounted with the surrounding portion of the panel.

Mitigation or attenuation of the radar cross-section of modern stealthy aircraft is a focus of concern and considerable research and development. Nearly all aspects of the aircraft which contribute to the overall aircraft radar signature is of interest. In this respect, there have been several prior art attempts to mitigate reflected radar emissions or signals associated with the multitude of panel fasteners disposed about the aircraft surface.

It is contemplated that aircraft surface contour irregularities tend to increase radar reflection characteristics. Such discontinuities can occur at the circular interface or surface gap between the panel and the fastener head. As mentioned above, the fasteners may be initially flush-mounted with the surface of the associated panel via a countersink and counterbore arrangement. Such flush-mounting can be disrupted by a common practice of applying a radar absorptive material (RAM) to the panels. Thus, when the fastener is installed, a depression is formed in the surface contour which is above the fastener head the depth of the RAM material applied to the associated panel.

In addition to surface contour irregularities, variations between interfacing materials tend to increase the radar reflectivity. In this respect, when aircraft panels are exposed to electromagnetic energy used for radar detection, localized currents are distributed throughout the panels, which are typically metallic or highly conductive composites. Where these localized currents encounter a significant change in electromagnetic material properties, radar signals may be reflected therefrom. Such a significant change in electromagnetic material properties can arise where there is a void or lack of material, as in the case with the above-described depression above a flush-mounted fastener installed in a RAM coated panel.

Prior attempts to modify the radar cross-section associated with these fasteners include the application of RAM material. Such a process begins with the initial installation of the fasteners. A RAM material is then applied to the surface of the panels and across the fastener heads. The RAM material may be a spray-on type of coating or may take the form of what is referred to as "caulk and tape" type of application. The RAM material is then allowed to cure as required. As a result, a RAM layer is formed which encapsulates the surface discontinuities present at the fastener-to-panel interface and the fastener tool recess. While this process improves the surface continuity characteristics, the application process is undesirably time and labor consumptive and requires specialized training. Further, such RAM materials must be removed to reveal the fastener driver tool recess before the fastener can be removed when it is desired to open the associated panel. Furthermore, upon subsequent closure of the panel, the entire RAM application process must be repeated.

Another prior art approach to modify the radar cross-section associated with aircraft fasteners includes the use of covers or caps which fit atop the fastener head. Examples of this general approach are seen in U.S. Pat. No. 5,603,472 to Hutter, III and U.S. Pat. No. 5,391,028 to Charles. Such covers have a top surface which is configured to align with the adjacent RAM coated panels, and thus improves the surface continuity characteristics thereat. These designs, however, typically call for modification of the driver tool recess formed in the fastener head in order to facilitate the cover attachment. For example, the driver tool recess may be required to include inner threads which engage a plug portion of the cover. As a result, such a radar mitigation approach precludes use of standard fasteners. In addition, the cover must be securely attached to the fastener head in order to prevent undesirable disengagement during aircraft operations. In addition to exposing the fastener head, such disengagement may result in ingestion of the cover by an aircraft engine causing extensive damage. Thus, this approach requires time and labor to attach and inspect the covers. Moreover, such covers must typically be removed in order to remove the associated fasteners. This increases the overall fastener removal time. In some fastener head cover designs, the covers may require specialized driver tools for installation and removal.

Accordingly, there is a need in the art for a fastener treatment which is able to achieve a reduction of radar observability, facilitates ease of fastener installation and removal, and is relatively cost, time and labor efficient.

SUMMARY OF THE INVENTION

In accordance with the present invention, there is provided a low observable fastener for use with a panel structure having a panel bore formed therein. The panel structure has a RAM panel layer formed thereon. The RAM panel layer has a RAM panel layer bore formed therethrough aligned with the panel bore. The RAM panel layer bore defines an inner surface. Preferably, the inner surface is cylindrical or conical in shape. The fastener is provided with a fastener head disposable within the panel bore. The fastener head has a tool engagement recess formed therein. The fastener is further provided with a RAM treatment layer disposed upon the fastener head. The RAM treatment layer has a fastener access bore aligned with the tool engagement recess of the fastener head. The RAM treatment layer further has a cylindrical outer surface sized and configured to be concentrically received by the inner surface of the RAM panel layer. The cylindrical outer surface is sized and configured to absorb electromagnetic energy radiating from the inner surface of the RAM panel layer for mitigating radar emissions formed adjacent thereto.

Thus, it is contemplated that the RAM treatment layer advantageously occupies a void or depression formed above the installed fastener head and within the RAM panel layer. This increases the overall surface continuity of the RAM panel layer atop the panel structure. Such increase in surface continuity tends to mitigate the associated radar reflectivity thereat. Further, the inclusion of the RAM treatment layer increases the continuity of material electromagnetic characteristics across the RAM panel layer. Such increase in material electromagnetic continuity tends to further mitigate the associated radar reflectivity thereat.

Where the inner surface of the RAM panel layer is cylindrical in shape, the inner surface has an inner surface diameter. In this embodiment, the cylindrical outer surface of the RAM treatment layer has an outer surface diameter which is less than the inner surface diameter of the RAM panel layer. Furthermore, where the inner surface of the RAM panel layer is conical in shape, the inner surface has a minimum diameter adjacent the panel structure. In this embodiment, the cylindrical outer surface of the RAM treatment layer has an outer surface diameter which is less than the inner surface diameter of the RAM panel layer. In either embodiment, the cylindrical outer surface of the RAM treatment layer is sized and configured to form a gap between the inner surface of the RAM panel layer. It is contemplated that the particular sizing of the cylindrical RAM treatment layer tends to mitigate abrasive contact between the inner surface of the RAM panel layer and the cylindrical outer surface of the RAM treatment layer during insertion/removal of the fastener into and out of the panel structure.

In the preferred embodiment of the present invention, the RAM panel layer and the RAM treatment layer are formed to have substantially the same thickness. In this respect, the RAM panel layer has a RAM panel layer surface, and the RAM treatment layer is formed to have a RAM treatment layer surface which is substantially aligned with the RAM panel layer surface.

Advantageously, it is contemplated that the present invention may be practiced with standard types of aircraft fasteners. In this respect, the tool engagement recess of the fastener head may formed to correspond to any driver tool configuration, such as Allen-head, Torx-head or Phillips-head configurations. It is contemplated that the tool engagement recess may be sized and configured to engage a driver tool having a tool diameter. The fastener access bore of the RAM treatment layer is formed to have a diameter greater than the tool diameter for mitigating abrasive contact with the driver tool.

In another embodiment of the present invention, there is provided a method for reducing the radar signature associated with a fastener for use with a panel structure as described above. The method calls for positioning a RAM treatment layer adjacent to the fastener head. The RAM treatment layer may be disposed adjacent the fastener head via any number of methods, such as adhesive bonding or molding, for example. The RAM treatment layer has a cylindrical outer surface and a fastener access bore extending therethrough. The fastener access bore of the RAM treatment layer is aligned with the tool engagement recess of the fastener head. The cylindrical outer surface of the RAM treatment layer is concentrically received by the inner surface of the RAM panel layer. Electromagnetic energy is coupled between the inner surface of the RAM panel layer and the cylindrical outer surface of the RAM treatment layer for mitigating radar emissions formed adjacent thereto.

The low observable fastener constructed in accordance with the present invention presents numerous advantages not found in the related prior art. In this respect, the present invention is particularly adapted to reduce the overall aircraft radar cross-section by altering the surface continuity and material absorption characteristics through the use of the RAM treatment layer. Significantly, the RAM treatment layer has a fastener access bore formed therethrough which is aligned with the tool engagement recess of the fastener head. This facilitates installation and removal of the fastener with the RAM treatment layer attached thereto. It is contemplated standard fasteners could be pre-treated and stocked with the RAM treatment layers. The steps required for installation and removal of the fastener of the present invention are the same as with a standard fastener. A driver tool is engaged with the tool engagement recess of the fastener head through the fastener access bore of the RAM treatment layer. Thus, unlike many prior art fastener radar reflection mitigation approaches, the fastener of the present invention avoids subsequent attachment of material, such as a RAM coating or fastener head cover, after the fastener is installed. Similarly, the fastener of the present invention avoids the initial removal step of such RAM coating or cover prior to gain access to the tool engagement recess for fastener removal.

As such, the aircraft fastener treatment constructed in accordance with the present invention represents a significant advancement in the art.

BRIEF DESCRIPTION OF THE DRAWINGS

These, as well as other features of the present invention, will become more apparent upon reference to the drawings wherein.

DETAILED DESCRIPTION OF THE PREFERRED EMBODIMENTS

Figure 1:
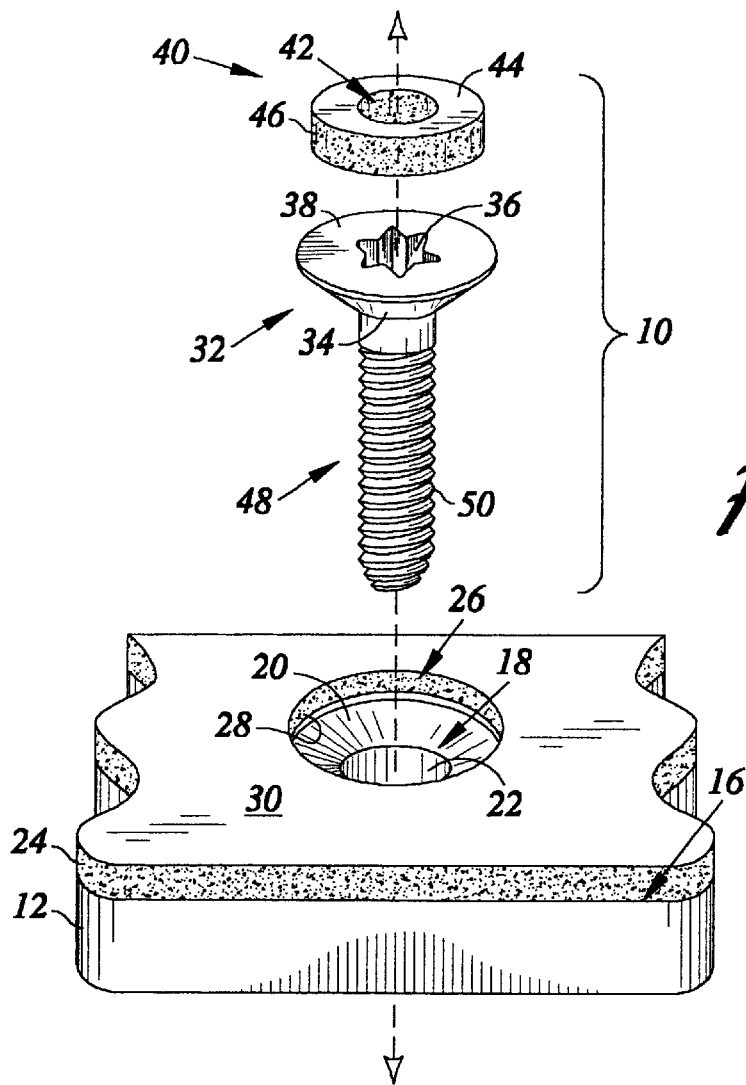
FIG. 1 is an exploded perspective view of the panel fastener door of the present invention depicted with a panel structure.
Figure 2:
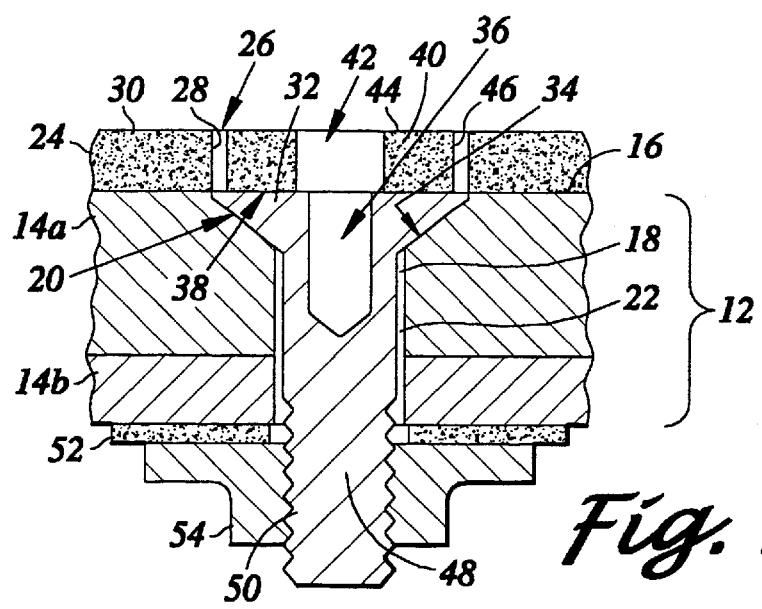
FIG. 2 is side cross-sectional view of the panel fastener of the present invention in its installed position within a panel structure.

Referring now to the drawings wherein the showings are for purposes of illustrating preferred embodiments of the present invention only, and not for purposes of limiting the same, FIGS. 1–2 illustrate a low observable fastener 10 constructed in accordance with the present invention. As will be described in more detail below, the low observable fastener 10 is specifically adapted to mitigate radar reflectivity characteristics typically associated with aircraft panel fasteners.

In accordance with the present invention, there is provided a low observable fastener 10 for use with a panel structure 12. The panel structure 12 may be formed of one or more layers, such as panel layers 14a, 14b shown in FIG. 2. The panel structure 12 may be formed of any suitable material, although a metal alloy or composite is typically used. The panel structure 12 has a panel structure surface 16 which typically, although not required, conforms to the surface contour of the adjacent aircraft skin. The panel structure 12 has a panel bore 18 formed therein. The panel bore 18 may include a conical countersink portion 20 which radially extends from a main bore portion 22 and has a maximum counterbore diameter adjacent the panel structure surface 16.

The panel structure 12 has a RAM panel layer 24 formed thereon. The RAM panel layer 24 is formed of a radar absorptive material (RAM) which is chosen from those which are well known to one of ordinary skill in the art. The RAM panel layer 24 has a RAM panel layer bore 26 formed therethrough which is aligned with the panel bore 18. The RAM panel layer bore 18 generally defines an inner surface 28. In one embodiment, the inner surface 28 is cylindrical shaped having an inner surface diameter, as shown in FIGS. 1 and 2. The inner surface diameter is typically roughly the same as the underlying panel bore 18. Where the panel bore 18 includes a conical countersink portion 20, the inner surface diameter is typically roughly the same as the maximum counterbore diameter adjacent to the panel structure surface 16, as depicted in FIGS. 1 and 2. Although not required, it is contemplated that such sizing facilitates a maximum coverage of the panel structure surface 16 with the RAM panel layer 24. It is further contemplated that the inner surface 28 may be of a conical shape. In this regard, the inner surface 28 may follow the counter-sink of the RAM panel layer bore 18. Further, the RAM panel layer 24 has an exterior surface 30 which intersects the inner surface 28 thereof. It is contemplated that such intersection need not be formed to be a sharp right angle as depicted. Such intersection may be of a more rounded lip configuration.

The fastener 10 is provided with a fastener head 32 which is disposable within the panel bore 18. Preferably, the fastener head 32 includes a conical countersink portion 34. It is contemplated that when the fastener 10 is installed in its operable position within the panel structure 12, the countersink portion 34 of the fastener head 32 is cooperatively formed to seat within the counterbore portion 20 of the panel bore 18. Such configuration allows the fastener head 32 to be substantially flush-mounted with the surrounding panel structure surface 16.

The fastener head 32 has a tool engagement recess 36 formed in a fastener head surface 38 thereof. The tool engagement recess 36 of the fastener head 32 may formed to correspond to any driver tool configuration, such as Allen-head, Torx-head or Phillips-head configurations.

The fastener 10 is further provided with a RAM treatment layer 40 disposed upon the fastener head 32. The RAM treatment layer 40 has a top surface 44. The top surface 44 is depicted as being generally flat, however, other geometries are contemplated such as rounded or chamfered. A fastener access bore 42 formed in the top surface 44. The fastener access bore 42 is aligned with the tool engagement recess 36 of the fastener head 32. Preferably, the fastener access bore 42 of the RAM treatment layer 40 is formed to have a diameter greater than a tool diameter of the associated driver tool for mitigating abrasive contact with the driver tool. The RAM treatment layer 40 further has a cylindrical outer surface 46 which is sized and configured to be concentrically received by the inner surface 28 of the RAM panel layer 24. Thus, the RAM treatment layer 40 is generally toroid or washer shaped. The top surface 44 of the RAM treatment layer 40 intersects the cylindrical outer surface 46 thereof. It is contemplated that such intersection need not be formed to be a sharp right angle as depicted. Such intersection may be of a more rounded lip configuration.

Importantly, the cylindrical outer surface 46 is sized and configured to absorb electromagnetic energy radiated from the inner surface 28 of the RAM panel layer 24 for mitigating radar emissions formed adjacent thereto. Further, the cylindrical outer surface 46 is sized and configured to absorb electromagnetic energy which may be radiated from the fastener head surface 38. It is contemplated that significant variations of material electromagnetic characteristics between interfacing materials tend to increase the radar reflectivity. In this respect, exposure of the RAM coated panel structure 12 to electromagnetic energy used for radar detection results in localized currents being distributed throughout the panel structure 12 and the overlying RAM panel layer 24. Where these localized currents encounter a significant change in electromagnetic material properties, radar signals may be reflected therefrom. In the absence of the RAM treatment layer 40, such a significant change in electromagnetic material properties would arise as a result of the formation of a void or lack of material within the RAM panel layer bore 26. Thus, the inclusion of the RAM treatment layer 40 increases the continuity of electromagnetic characteristics across the RAM panel layer 24. Such increase in material electromagnetic continuity tends to mitigate the associated radar reflectivity thereat. The RAM treatment layer 40 may be formed of a material which is chosen from those which are well known to those of ordinary skill in the art. In the preferred embodiment, the RAM treatment layer 40 and the adjacent RAM panel layer 24 are formed of material having a substantially similar conductivity characteristics. In this respect, although not required, the same material may be used to form both the RAM treatment layer 40 and the RAM panel layer 24.

In addition, it is contemplated that the RAM treatment layer 40 advantageously occupies a void or depression formed above the installed fastener head 32 and within the RAM panel layer bore 26. This increases the overall surface continuity of the exterior surface 30 of the RAM panel layer 24 atop the panel structure 12. Such increase in surface continuity tends to further mitigate the associated radar reflectivity thereat. In this respect, the top surface 44 of the RAM treatment layer 40 is sized and configured with the top surface 44 thereof to be substantially aligned or generally coplanar with the exterior surface 30 of the RAM panel layer 24. As such, RAM treatment layer 40 may be sized and configured to radiate a radar signature which destructively interferes with a radar signature emanating from the inner surface 28 of the RAM panel layer 24. preferred embodiment of the present invention, the RAM panel layer 24 and the RAM treatment layer 40 are formed to have substantially the same thickness or height.

The RAM treatment layer 40 may be configured to further mitigate the associated radar reflectivity thereat, in addition to the absorption and material electromagnetic property continuity benefits described above. In this regard, the RAM treatment layer 40 may be sized and configured to radiate a radar signature which destructively interferes with a radar signature emanating from the inner surface 28 of the RAM panel layer 24. The RAM treatment layer 40 and the inner surface 28 of the RAM panel layer 24 may be relatively sized and configured to such that radar emissions emanating respectively therefrom are out of phase. As such, when the two signatures are combined, the net effect is that the combined signature is reduced in comparison to that of the inner surface 28. Such a signature cancellation is understood to tend to occur where the gap or spacing between the RAM treatment layer 40 and the inner surface 28 is reduced. In this regard, from a radar mitigation point of view, it is preferred that the RAM treatment layer 40 is flush-mounted with the inner surface 28 of the RAM panel layer 24, and that the RAM treatment layer 40 and the RAM panel layer 24 are from of materials having similar electromagnetic properties. While such a configuration is preferable, is is understood that a substantial radar mitigation may be achieveable whith maderate deviations in a gap spacing or flushness.

As such, in another embodiment of the present invention, the cylindrical outer surface 46 of the RAM treatment layer 40 has an outer surface diameter less than the diameter of the inner surface 28 of the RAM panel layer 24. In this respect, the cylindrical outer surface 46 of the RAM treatment layer 40 is specifially sized and configured to form a gap between the cylindrical inner surface 28 of the RAM panel layer 24. It is contemplated that the particular sizing of the RAM treatment layer 40 tends to mitigate abrasive contact between the cylindrical inner surface 28 of the RAM panel layer 24 and the cylindrical outer surface 46 of the RAM treatment layer 40 during insertion/removal of the fastener 10 into and out of the panel structure 12. It is contemplated that abrasive contact can result in undue damage to the RAM panel layer 24 and the RAM treatment layer 40. It is further contemplated that such damage can result in the undesirable presence of debris.

The sizing of the cylindrical outer surface 46 of the RAM treatment layer 40 may be adjusted by sizing the diameter of the fastener head 32 in relation to the cylindrical inner surface of the RAM panel layer. This approach allows the RAM treatment layer 40 to have a diameter which is substantially the same as the fastener head 32, as shown. Alternatively, the sizing of the cylindrical outer surface 46 of the RAM treatment layer 40 may be adjusted by having a reduced diameter in relation to the diameter of the fastener head 32, and thereby partially exposing the fastener head surface 38.

The RAM treatment layer 40 need not be in direct physical contact with the RAM panel layer 24 in order to facilitate the above-mentioned electromagnetic continuity enhancements. In this regard, the present invention recognizes that the contemplated electromagnetic energy currents can span or jump the gap between the cylindrical or conical inner surface 28 of the RAM panel layer 24 and the cylindrical outer surface 46 of the RAM treatment layer 40. Thus, the two surfaces may be physically apart and still be in electrical communication therewith. As such the configuration has the benefit of potentially avoiding undue damage to the RAM panel layer 24 at only an incremental loss in potential radar reflectivity mitigation. This facilitates avoidance of costly manufacturing tolerance specifications to require that the cylindrical inner surface 28 of the RAM panel layer 24 and the cylindrical outer surface 46 of the RAM treatment layer 40 be press-fit or in contact with one another for only a minimal gain in radar reflectivity mitigation.

Furthermore, in the preferred embodiment of the present invention, the fastener 10 is provided with a shank 48 having threads 50. A nut 54 may be used to engage the threads 50 the shank 48 with a nutplate 52 or washer disposed between the nut 54 and the panel structure 12. It is contemplated that other fastening elements may be substituted for the threaded shank/nut arrangement which are well known to one of ordinary skill in the art. In addition, it is contemplated that the present invention may be practiced with a grommet which is inserted between the shank 48 and the panel bore 22 of the panel structure 12.

In another embodiment of the present invention, there is provided a method for reducing the radar signature associated with a fastener for use with a panel structure 12 as described above. The method calls for positioning the RAM treatment layer 40 adjacent the fastener head 32. The RAM treatment layer 40 may be disposed adjacent the fastener head via any number of methods, such as adhesive bonding, molding, or spray-on techniques, for example. The fastener access bore 42 of the RAM treatment layer 40 is aligned with the tool engagement recess 36 of the fastener head 32. The cylindrical outer surface 46 of the RAM treatment layer 40 is concentrically received by the cylindrical or conical inner surface 28 of the RAM panel layer 24. Electromagnetic energy is coupled across the inner surface 28 of the RAM panel layer 24 and the cylindrical outer surface 46 of the RAM treatment layer 40 for mitigating radar emissions formed adjacent thereto.

Additional modifications and improvements of the present invention may also be apparent to those of ordinary skill in the art. Thus, the particular combination of parts described and illustrated herein is intended to represent only certain embodiments of the present invention, and is not intended to serve as limitations of alternative devices within the spirit and scope of the invention.

What is claimed is:

1. A low observable fastener for use with a panel structure having a panel bore formed therein, the panel structure having a RAM panel layer formed thereon, the RAM panel layer having a RAM panel layer bore formed therethrough aligned with the panel bore, the RAM panel layer bore defining an inner surface, the fastener comprising:
   a fastener head disposable within the panel bore, the fastener head having a tool engagement recess formed therein; and
   a RAM treatment layer disposed upon the fastener head and comprising:
      a fastener access bore aligned with the tool engagement recess of the fastener head; and
      a cylindrical outer surface sized and configured to be concentrically received by the inner surface of the RAM panel layer, the cylindrical outer surface being sized and configured to absorb electromagnetic energy radiating from the inner surface of the RAM panel layer for mitigating radar emissions formed adjacent thereto.

2. The low observable fastener of claim 1 wherein the inner surface of the RAM panel layer is cylindrically shaped and has an inner surface diameter, the cylindrical outer surface of the RAM treatment layer has an outer surface diameter less than the inner surface diameter for mitigating abrasive contact between the inner surface of the RAM panel layer and the cylindrical outer surface of the RAM treatment layer during insertion/removal of the fastener into and out of the panel structure.

3. The low observable fastener of claim 1 wherein the inner surface of the RAM panel layer is conically shaped.

4. The low observable fastener of claim 1 wherein the fastener head has a fastener head diameter, the cylindrical outer surface of the RAM treatment layer has an outer surface diameter substantially the same size as the fastener head diameter.

5. The low observable fastener of claim 1 wherein the fastener head has a fastener head diameter, the cylindrical outer surface of the RAM treatment layer has an outer surface diameter sized less than the fastener head diameter for mitigating abrasive contact between the inner surface of the RAM panel layer and the cylindrical outer surface of the RAM treatment layer during insertion/removal of the fastener into and out of the panel structure.

6. The low observable fastener of claim 1 wherein the cylindrical outer surface of the RAM treatment layer is sized and configured to form a gap between the inner surface of the RAM panel layer for mitigating abrasive contact between the inner surface of the RAM panel layer and the cylindrical outer surface of the RAM treatment layer during insertion/removal of the fastener into and out of the panel structure.

7. The low observable fastener of claim 1 wherein the RAM treatment layer and the RAM panel layer are formed of substantially the same material.

8. The low observable fastener of claim 1 wherein the RAM treatment layer and the RAM panel layer have similar electromagnetic properties.

9. The low observable fastener of claim 1 wherein the RAM treatment layer is generally toroid shaped.

10. The low observable fastener of claim 1 wherein the RAM panel layer and the RAM treatment layer are formed to have similar thickness.

11. The low observable fastener of claim 1 wherein the RAM panel layer having a RAM panel layer surface, the RAM treatment layer having a RAM treatment layer surface substantially aligned with the RAM panel layer surface.

12. The low observable fastener of claim 1 wherein the panel structure having a panel structure surface, the fastener head having a fastener head surface substantially aligned with the panel structure surface.

13. The low observable fastener of claim 1 wherein the fastener head is substantially flat.

14. The low observable fastener of claim 1 wherein the tool engagement recess being sized and configured to engage a driver tool having tool diameter, the fastener access bore having a diameter greater than the tool diameter for mitigating abrasive contact with the driver tool.

15. The low observable fastener of claim 1 wherein the RAM treatment layer is adhesively bonded to the fastener head.

16. The low observable fastener of claim 1 wherein the RAM treatment layer is sprayed onto to the fastener head.

17. The low observable fastener of claim 1 wherein the RAM treatment layer is molded to the fastener head.

18. The low observable fastener of claim 1 wherein the tool engagement recess is formed to have a Allen-head configuration.

19. The low observable fastener of claim 1 wherein the tool engagement recess is formed to have a TORX-head configuration.

20. The low observable fastener of claim 1 wherein the tool engagement recess is formed to have a Phillips-head configuration.

21. The low observable fastener of claim 1 wherein the panel bore having a counter sink portion, the fastener head being sized and configured to engage the counter sink portion of the panel bore.

22. The low observable fastener of claim 1 wherein the fastener head is formed of a conductive material.

23. The low observable fastener of claim 22 wherein the fastener head is formed of metal.

24. The low observable fastener of claim 1 further comprising a shank extending from the fastener head disposable within the panel bore.

25. The low observable fastener of claim 24 wherein the hank is threaded.

26. A low observable fastener treatment for use with a fastener formed to mate with a panel structure, the panel structure having a panel bore formed therein, the fastener having a fastener head disposable within the panel bore and having a tool engagement recess formed therein, the panel structure having a RAM panel layer formed thereon, the RAM panel layer having a RAM panel layer bore formed therethrough aligned with the panel bore, the RAM panel layer bore defining an inner surface, the fastener treatment comprising:
   a RAM treatment layer disposable upon the fastener head and comprising:
      a fastener access bore aligned with the tool engagement recess of the fastener head; and
      a cylindrical outer surface sized and configured to be concentrically received by the inner surface of the RAM panel layer, the cylindrical outer surface being sized and configured to absorb electromagnetic energy radiating from the inner surface of the RAM panel layer for mitigating radar emissions formed adjacent thereto.

27. A low observable fastening system comprising:
   a panel structure having a panel bore formed therethrough, the panel structure having a RAM panel layer formed thereon, the RAM panel layer having a RAM panel layer bore formed therethrough aligned with the panel bore, the RAM panel layer bore defining a inner surface;
   a fastener head disposable within the panel bore, the fastener head having a tool engagement recess formed therein; and
   a RAM treatment layer disposed upon the fastener head and comprising:
      a fastener access bore aligned with the tool engagement recess of the fastener head; and
      a cylindrical outer surface sized and configured to be concentrically received by the inner surface of the RAM panel layer, the cylindrical outer surface being sized and configured to absorb electromagnetic energy radiating from the inner surface of the RAM panel layer for mitigating radar emissions formed adjacent thereto.

28. A method for reducing the radar signature associated with a fastener for use with a panel structure having a panel bore formed therein, the panel structure having a RAM panel layer formed thereon, the RAM panel layer having a RAM panel layer bore formed therethrough aligned with the panel bore, the RAM panel layer bore defining an inner surface, the fastener head being disposable within the panel bore, the fastener head having a tool engagement recess formed therein, the method comprising the steps of:
   a) positioning a RAM treatment layer adjacent the fastener head, the RAM treatment layer having a cylindrical outer surface and a fastener access bore extending therethrough;
   b) aligning the fastener access bore of the RAM treatment layer with the tool engagement recess of the fastener head;
   c) concentrically receiving the cylindrical outer surface of the RAM treatment layer by the inner surface of the RAM panel layer; and
   d) absorbing electromagnetic energy radiating from the inner surface of the RAM panel layer with the cylindrical outer surface of the RAM treatment layer for mitigating radar emissions formed adjacent thereto.

29. The method of claim 28 wherein step (b) further comprises the step of adhesively bonding the RAM treatment layer to the fastener head.

30. The method of claim 28 wherein step (b) further comprises the step of spraying the RAM treatment layer onto the fastener head.

31. The method of claim 28 wherein step (b) further comprises the step of molding the RAM treatment layer to the fastener head.

32. The method of claim 28 wherein step (c) further comprises forming a gap between the inner surface of the RAM panel layer for mitigating abrasive contact between the inner surface of the RAM panel layer and the cylindrical outer surface of the RAM treatment layer during insertion/removal of the fastener into and out of the panel structure.

33. The method of claim 28 wherein the RAM panel layer has a RAM panel layer surface and the RAM treatment layer has a RAM treatment layer surface, wherein step (c) further comprises the step of substantially aligning the RAM treatment layer with the RAM panel layer surface.

* * * * *